United States Patent [19]
Luciani et al.

[11] Patent Number: 5,258,342
[45] Date of Patent: Nov. 2, 1993

[54] PROCESS FOR THE PREPARATION OF A SOLID COMPONENT OF CATALYST FOR THE (CO)POLYMERIZATION OF ETHYLENE

[75] Inventors: Luciano Luciani, Ferrara; Federico Milani, Santa Maria Maddalena; Maddalena Pondrelli, Budrio; Renzo Invernizzi, Milan, all of Italy

[73] Assignee: ECP Enichem Polimeri S.R.L., Milan, Italy

[21] Appl. No.: 811,496

[22] Filed: Feb. 26, 1992

[30] Foreign Application Priority Data

Feb. 28, 1991 [IT] Italy ............... MI 91 A 000521

[51] Int. Cl.$^5$ ............... C08F 4/685; C08F 4/646
[52] U.S. Cl. ............... 502/107; 502/104; 502/113; 526/114; 526/116
[58] Field of Search ............... 502/104, 107, 113

[56] References Cited
U.S. PATENT DOCUMENTS

| 4,324,691 | 4/1982 | Hartshorn et al. | 502/113 X |
| 4,554,265 | 11/1985 | Graves | 502/104 X |
| 4,562,170 | 12/1985 | Graves | 502/113 |
| 4,578,373 | 3/1986 | Graves | 502/113 |
| 4,618,660 | 10/1986 | Graves | 502/113 X |

Primary Examiner—Patrick P. Garvin
Attorney, Agent, or Firm—Oblon, Spivak, McClelland, Maier & Neustadt

[57] ABSTRACT

A process for the preparation of a solid component of a catalyst active in the (co)polymerization of ethylene and able to form (co)polymers of ethylene having from middle to wide distribution of molecular weight and monomodal distribution of molecular weights, in processes operating in a single step, in suspension or in the gaseous phase. Said solid component of a catalyst contains magnesium, chlorine, silicon, titanium and at least another transition metal on a solid, granular and porous carrier and is obtained by treating the carrier, in succession, with: a compound of a metal selected from hafnium, zirconium or vanadium; a magnesium dialkyl or magnesium alkyl halide; a silicon chloride; and a titanium compound.

20 Claims, No Drawings

PROCESS FOR THE PREPARATION OF A SOLID COMPONENT OF CATALYST FOR THE (CO)POLYMERIZATION OF ETHYLENE

FIELD OF THE INVENTION

The present invention relates to a process for the preparation of a solid component of a catalyst active in the (co)polymerization of ethylene. The invention relates also to the solid component of a catalyst thus produced and to its use in processes for the (co)polymerization of ethylene carried out in suspension or in gaseous phase.

DISCUSSION OF THE BACKGROUND

There are known in the art catalytic systems of the Ziegler-Natta type, active in the polymerization of alpha-olefins, generally consisting of the combination of an organometal compound of elements of groups I-III and of a compound of a transition metal belonging to groups from IV to VI of the Periodic table (Boor Jr., "Ziegler-Natta Catalysts and Polymerization", Academic, New York, 1979). Generally an aluminum alkyl is used as the organometallic compound and a titanium halide is used as the transition metal compound. The possibility of binding or depositing said titanium halide on a solid and granular carrier is also known (Karol F. J., Catal. Rev.-Sci. EngN, 26, 384, 557–595, (1984)).

The activation of the magnesium chloride and its use for preparing catalysts comprising titanium salts, highly active for polymerizing olefins is also known, for instance as described in DE 2 153 520 (CA 77,62505,1972); DE 2 638 429 (CA 83,59870,1972); DE 2 638 429 (CA 86,140706,1975); Be 848 427 (CA 87, 68839,1977); and JP 79/118 484 (CA 92, 59450,1979). Finally, it is known that heterogeneous catalysts for the polymerization of alpha-olefins are able to replicate their morphology in an equivalent polymeric morphology; this is made possible by carrying out complicated technological conditions for the synthesis of the catalyst (Karol F. J., above mentioned, and McDaniel M. P., J. Polym. Sci., Polym. Chem. Ed., 19,1967–1976,1981).

The market for polyolefins requires products which are more and more suitable to satisfy different application requirements, whereas there is also the requirement of simplifying the production processes for polyolefins, in order to reduce investment and production costs. In particular, there is felt the requirement to have catalysts, which are not only simple and inexpensive, but are suitable for producing if possible in one single polymerization step olefinic homoplymers and copolymers suitable either for extrusion or molding.

Eaborn C. E. in "Organo Silicon Compounds; Butterworths Scientific Publications, London 1960; Rochow E. G. in "The Chemistry of Silicon" New York, 1975; and Voorhoeve R. J. H. in "Organosilanes", Elsevier, New York, 1967, describe an alkylation reaction between a dialkylmagnesium, or an alkylmagnesium halide and silicon tetrachloride, which gives yield to a non crystalline solid compound. M. P. McDaniel, J. Catal., 76, 17 (1982); M. P. McDaniel, J. Phys. Chem., 85, 532 (1981); C. G. Armistead et al., J. Phys. Chem., 73/II, 3947 (1969); R. J. Peylar et al., J. Catal., 20, 309 (1971); J. Kunawicz et al., Trans. Faraday Soc. 67, 3848 (1971) describe the adsorption of a magnesium dialkyl or a magnesium alkyl chloride, as well as of halogenated compounds, such as silicon tetrachloride and titanium tetrachloride, on a silica or other inert carrier containing hydroxyl groups.

It has now found according to the present invention, that a dialkylmagnesium or an alkylmagnesium halide, are able to interact with a silicon chloride on a solid and porous carrier on which a compound of a transition metal, such as hafnium, zirconium or vanadium has been previously adsorbed. It has also been found that the solid product of this reaction is able to interact with a titanium compound to give a solid component of catalyst highly active for the polymerization of ethylene and for the copolymerization of ethylene with alpha-olefins. Thus, according to the present invention it is possible to obtain in a simple and cheap way solid components of catalysts, highly active in the (co)polymerization of ethylene in processes working in suspension or in gaseos phase, in one single step, and which are able to produce ethylene polymers having the desired density values, a distribution of the molecular weight from middle to wide and a monomodal distribution of the molecular weights.

The present invention relates to a process for the preparation of a solid component of a catalyst for the (co)polymerization of ethylene, containing magnesium chloride, silicon, titanium and at least another metal selected from hafnium, zirconium and vanadium, on a granular solid carrier, said process comprising:

(i) adsorbing a compound of a metal M selected from hafnium, zirconium or vanadium on a granular and porous solid carrier by contacting this carrier with a solution of the metal M, in an organic solvent, followed by evaporation of the solvent;

(ii) impregnating the solid carrier treated in step (i) by contacting it with a solution, in an organic solvent, of a dialkyl magnesium or alkylmagnesium halide, followed by evaporation of the solvent;

(iii) contacting the solid carrier treated in step (ii) with a silicon chloride; and (iv) contacting the solid carrier treated in step (iii) with a titanium compound to give a solid component of catalyst;

Wherein the quantity of the carrier in said solid component of catalyst is 30 to 90% by weight, the atomic ratios among titanium, metal M, magnesium and silicon in the reagents being within the following ranges: Ti:M:Mg:Si=1:0.1–3:1–20:0.1–50.

Step (i)

In step (i) of the process according to the present invention, a compound of hafnium, zirconium or vanadium is adsorbed on a granular and porous solid carrier.

Carriers suitable for the purpose are selected from granular and porous solid carriers, preferably spherical, having an average particle size of the order of micrometers and a relatively closed distribution of the particles. Carriers can be of organic or inorganic nature. Carriers of organic nature can be porous and foamed olefine or styrene polymers. Among the carriers of inorganic nature, silica and alumina are preferred. Among all carriers the microspheroidal silica having a size of the particles from 20 to 100 micrometers, a surface area BET from 150 to 400 m$^2$/g, a total porosity higher than 60% and a pore radius from 50 to 200 Angstrom is preferred. Such a silica can be thermally pre-activated, for instance by heating it in an inert atmosphere, such as nitrogen. However, an advantage of the present invention is the fact that silica can be used without any previous activation.

Compounds of vanadium, zirconium and hafnium useful for the impregnation of the carrier are generally selected from chlorides, oxychlorides and alkoxides, and preferably among chlorides, such as for instance vanadium trichloride, zirconium tetrachloride and hafnium tetrachloride.

In the practical embodiment of step (i) of the process, a solution of the metal M in an organic solvent is prepared. Solvents suitable to the purpose are alkyl esters of aliphatic or aromatic carboxylic acids and aliphatic ethers, especially cyclic ethers. Specific examples of solvents are ethyl formate, methyl acetate, ethyl acetate, propyl acetate, isopropyl acetate and tetrahydrofurane. The preferred solvent is ethyl-acetate. Solutions having a concentration of the compound of metal M within 1-2% by weight are used and the work is carried out under oversaturation conditions of the solution. To the solution of the metal M thus obtained, the granular carrier is added while keeping a weight ratio between the carrier and the compound of the metal M equal to at least 2/1 and the impregnation of the carrier is carried out by heating the resulting suspension at a temperature higher than the room temperature and preferably at a temperature within the range of from 78° to 80° C. for a period of time within the range of from 0.5 to 2 hours and preferably of about 1 hour.

By working under these conditions, the compound of the metal M is adsorbed within the carrier by a mechanism which is not completely known, even if one can believe that it involves physical and chemical phenomena, possibly through reactions involving the hydroxyl groups of the carrier.

At the end of the impregnation, the solvent is removed by evaporation by working under reduced pressure and at temperatures equal or similar to those used for the impregnation and the impregnated carrier is recovered.

Step (ii)

In step (ii) of the process of the present invention, the solid carrier treated in step (i) is impregnated by contact with a solution in an organic solvent of a magnesium dialkyl or magnesium alkyl halide, preferably chloride.

Magnesium compounds suitable to the purpose are those which can be defined by the formulas MgR'R" and MgRCl wherein R', R" and R represent each independently a linear or branched alkyl group, containing from 1 to 10 C and X represents a halogen atom and preferably a chlorine atom. Specific examples of magnesium dialkyls are magnesium diethyl, magnesium ethylbutyl, magnesium dihexyl, magnesium butyloctyl and magnesium dioctyl and the corresponding chloroderivatives. Solvents useful to solubilize the above mentioned compounds are the organic solvents liquid under the working conditions and inert (not reactive) towards the other components. Examples of suitable solvents are hydrocarbons, especially aliphatic hydrocarbons such as for instance pentane, isopentane, hexane, heptane and octane.

In the practical embodiment of the step (ii), the carrier impregnated in step (i) is added to the solution of the magnesium compound while keeping a molar ratio between the magnesium compound and the compound of the metal M equal to or higher than 1/1 and the resulting suspension is kept at a temperature from the room temperature (20°-25° C.) to the boiling point of the solvent used, for a time from about 10 minutes to about 2 hours, according to the selected temperature. Preferably the step is worked at a temperature of about 50°-70° C. for 0.5-1 hour.

The deposition of the magnesium compound on the carrier impregnated in step (i) occurs in this step (ii). It is possible that this deposition involves some interaction forms between the magnesium compound and hydroxyl groups of the carrier which have not interacted in step (i).

At the end of the treatment, the solid is separated from the solution, for instance by filtration, and subjected to washing with a liquid aliphatic hydrocarbon and optionally dried.

Step (iii)

In step (iii) of the process, the solid carrier treated in step (ii) is contacted and allowed to react with a silicon chloride.

Silicon chlorides suitable to this purpose are silicon tetrachloride and chlorosilanes, such as for instance trichlorosilane, vinyltrichlorosilane, trichlroethoxysilane and chloroethyltrichlorosilane. To this purpose the silicon tetrachloride is preferred.

In the practical embodiment of the step (iii), the solid obtained in the step (ii) is suspended in an inert solvent (non rective) and generally in an aliphatic hydrocarbon such as for instance pentane, isopentane, hexane, heptane and octane and to the thus obtained suspension a silicon chloride is added. The thus obtained suspension is heated at a temperature of from 40° to 100° C. for a period of time of from 0.5 to 5 hours. Preferably the operation is carried out at 70°-95° C. for 1-2 hours.

It is believed that in this step a chlorination reaction occurs of the magnesium compound depositated in the step (ii) and the silicon compound, with formation of a solid highly reactive with the titanium compound.

At the end of the treatment the solid is separated from the solution, for instance by filtration and is subjected to a washing with a liquid aliphatic hydrocarbon and is optionally dried.

Step (iv)

In the step (iv) of the process, the solid carrier treated in step (iii) is contacted and allowed to interact with a titanium compound to give a solid component of catalyst.

The titanium compound suitable to this purpose is selected from chlorides, alkoxides and chloroalkoxides of titanium. Specific examples are titanium tetrachloride, titanium tetra-n.propylate, titanium tetra-n.butylate, titanium tetra-i.propylate, titanium tetra-i.butylate and the corresponding titanium mono- or dichloro alkoxides. Mixture of two or more among the above mentioned titanium compounds can be used.

In a practical embodiment of the step (iv), the solid obtained in step (iii) is suspended in an inert organic solvent, such as a hydrocarbon solvent, especially an aliphatic hydrocarbon, for instance hexane, heptane, octane, etc., and the titanium compound, optionally dissolved in the same solvent or in a similar solvent, is added to the suspension. Preferably, a quantity of titanium compound will be used such as to have an atomic ratio between the titanium and silicon (in the silicon chloride of step (iii) Ti:Si=1:3-40. The suspension thus obtained is kept at a temperature from 50° to 100° C. and preferably from 60° to 90° C. for a period of time from 0.5 to 5 hours and preferably within the range of 1-2 hours.

By this way, there is obtained a solid component of catalyst which can be recovered from the corresponding suspension, for instance by evaporating the organic solvent under normal or reduced pressure.

The solid component of catalyst obtained by the process of steps from (i) to (iv) contains magnesium, chlorine, silicon, titanium and at least another metal selected from hafnium, zirconium and vanadium, on a solid, granular and porous carrier, and preferably a silica carrier.

In the preferred embodiment the carrier is from 40 to 70% by weight of the solid component of the catalyst, with the following atomic ratios in the catalytically active portion Ti:M:Mg=1:0.5-2:2-8. In this solid component of catalyst the titanium is partially in the trivalent state and partially in the tetravalent state, with a ratio between the two forms depending mainly on the particular titanium compound used in the synthesis in step (iv) and on the ratio among the magnesium and silicon compounds used in steps (ii) and (iii).

When in step (iv) an alkoxide or a chloroalkoxide of titanium, or a mixture of alkoxide and titanium chloride is used, the solid component of catalyst is suitably subjected to an activation treatment. This activation is carried out in a further step (v) by contacting the component obtained at the end of step (iv) with the chloride of an alkylaluminium, such as for instance diethylaluminium chloride, ethylaluminium sesquichloride and diisobutylaluminium chloride. More particularly, the solid component of catalyst, suspended in an inert organic solvent, such as a hydrocarbon solvent, for instance hexane, or heptane, is contacted with an alkyl aluminium chloride, with a ratio between chlorine atoms in the alkylaluminum chloride and the alkoxy groups of the alkoxide or chloroalkoxide of titanium, from 0.1/1 to 10/1 and the suspension is kept at a temperature from 10° to 100° C., for a period of time from 10 minutes to 5 hours. At the end of the treatment the solid component of catalyst can be recovered from the corresponding suspension, for instance by filtration, washed with a hydrocarbon solvent and, if desired, it can be subjected to drying. By this activation treatment, the chlorine content in the solid component of catalyst is increased and the ratio between the titanium in the tetravalent state and the titanium in the trivalent state is also reduced. Typically, the solid component of catalyst of the present invention contains a percentage of trivalent titanium within the range of from 10 to 50% of the total titanium, the remaining percentage being titanium in the tetravalent state.

Furthermore, the present invention relates to catalysts for the (co)polymerization of ethylene, consisting of the solid component of catalyst above described, in combination with an organometallic compound of aluminium (co-catalyst) which can be selected among aluminium trialkyls and halides (especially chlorides) of alkylaluminium, which contain from 1 to 6 carbon atoms in the alkyl portion. Among these aluminum trialkyls, such as triethlaluminum, tributylaluminium, triisobutylaluminium and trihexylaluminium are preferred. In the catalysts of the present invention the atomic ratio between the aluminium (in the co-catalyst) and the titanium (in the solid component of th catalyst) generally varies from 0.5:1 to 1,000:1 and preferably from 50:1 to 200:1.

These catalyst are highly active in processes for the polymerization of ethylene and copolymerization of ethylene with alpha-olefins and can be used in polymerizations carried out by the technique of the suspension in an inert diluent, or by the technique in gaseous phase, in fluid bed or in agitated bed. Alpha-olefins which can be copolymerized are generally those containing from 3 to 15 carbon atoms, such as butene-1, hexene-1, 4-methylpentene-1, octene-1, undecene-1, ethylidene norbornene and 1,4-hexadiene. General conditions for the polymerization are: temperature from 50° to 100° C., total pressure from 5 to 40 bar, with a ratio between partial pressures of hydrogen and ethylene from 0 to 10. By the catalysts of the present invention there are obtained ethylene polymers and copolymers having a density from high to low, with a distribution of the molecular weight from middle to wide and with a monomodal distribution of molecular weights. In any case a high productivity in the olefinic polymer is achieved and the thus obtained polymer shows a very good reology and in particular it is in the form granules which are not crumbly, more than 95% by weight of which have a granule size from 250 to 1000 um, fines granules being absent.

The experimental examples which follow are reported to illustrate the invention.

In these experimental examples a microspheroidal silica is used as the carrier, the average diameter of the particles being 40 micrometers, and showing the following characteristics: apparent density 0.27 g/ml; surface area (BET) 307 m$^2$/g; total porosity 92.6% and average radius of pores 132 Angstrom.

EXAMPLE 1

In a 500 ml round bottom flask provided with reflux cooler, mechanical agitator and thermometer, 4.4 g (13.7 mmols) of hafnium tetrachloride and 220 ml of anhydrous ethylacetate are introduced under nitrogen. The mixture is heated at the temperature of 77° C. for about 1 hr., to solubilize the hafnium tetrachloride. In the thus obtained solution 17 g of microspheroidal silica are suspended and the solution is kept in contact for 1 hr. at the reflux temperature. Thereafter the ethylacetate is removed from the solution by evaporation.

The thus obtained solid is suspended in 228 ml of a n-heptane solution containing 9.142 g (54.9 mmols) of $Mg(C_4H_9)_{1.5}(C_8H_{17})_{0.5}$. The suspension is contacted for 30 minutes at the temperature of 60° C. and at the end of this time the solid is recovered by filtration, washed many times with n-heptane and suspended in about 200 ml of n-heptane.

To the suspension thus obtained 35 ml (475 mmols) of silicon tetrachloride are added; it is contacted for 1 hr at the temperature of 75° C. and at the end of this period of time the solid is recovered by filtration, washed many times with n-heptane and suspended in 200 ml of n-heptane.

The suspension thus obtained is added with 1.54 ml (14 mmols) of titanium tetrachloride, is contacted for 2 hours at 95° C. and finally is concentrated to dryness by evaporating the solvent.

By this way 25.5 g of a solid component of catalyst containing 14.9% by weight of chlorine, 3.6% by weight of magnesium and 2.5% by weight of titanium is obtained. The titanium is for 31% in the trivalent state and for the remaining percentage in the tetravalent state.

The main conditions for obtaining the solid component of catalyst are summarized in Table I and more particularly:

molar ratios among titanium, hafnium magnesium, silicon reagents;

the ratio by weight between hafnium tetrachloride and silica ($HfCl_4/SiO_2$);

the % by mols of titanium supplied as $TiCl_4$ on the total titanium supplied (% $TiCl_4$/Ti total);

the % by mols of titanium supplied as titanium tetrabutylate on the total titanium supplied (% $Ti(OBu)_4$/Ti tot.);

the % by weight of trivalent titanium on the total titanium in the solid component of catalyst (Ti(III) % by; w.) are reported in Table I.

The solid component of catalyst prepared as described above, is used in a series of ethylene polymerisations tests (tests from 1.1 to 1.9). More particularly, the polymerization is carried out by working in a 5 liters volume autoclave, containing 2 liters of n-hexane. Furthermore, it is operated under ethylene and hydrogen pressure using 100 mg of the solid component of catalyst and aluminum alkyl as cocatalyst. The polymerization conditions and more particularly:

the total pressure used in bar (Press.(bar));

the polymerization temperature in degrees centigrade (Temp. (°C.));

the polymerization time in hours (time (hours));

the ratio between the hydrogen pressure and the ethylene pressure ($P(H_2)/P(C_2^-)$);

the cocatalyst used (cocat.)(TEA=aluminum triethyl); TIBA=aluminum triisobutyl);

the molar ratio between the aluminum in the cocatalyst and the titanium in the solid component of catalyst (Al/Ti (mols)) are reported in Table II.

The results of the polymerization are reported in Table III. More particularly, this table reports values relating to:

Yield: expressed as polyethylene kg for titanium g and for hour;

MFI: (Melt Flow Index- ASTM D-1238) of the obtained polyethylene, in g/10, expressed as: MFI E=MFI at 2.16 kg; MFI P=MFI at 5.00 kg; MFI F=MFI at 21.6 kg;

F/E: ratio between MFI at 21.6 kg and MFI a 2.16 kg;

F/P: ratio between MFI at 21.6 kg and MFI at 5.00 kg;

Dens: density of polyethylene in g/ml (ASTM D-1505);

D. app.: apparent density of polyethylene in g/ml (ASTM D-1895):

Slid.: sliding of polyethylene expressed in seconds, determined according to ASTM D-1895.

Finally, in Table IV the distribution (percent by weight) of the granules size (micrometers) of the produced polyethylene is reported.

EXAMPLE 2

In the preparation of the solid component of catalyst, the operation is carried out as in example 1, but titanium tetrabutylate in quantity of 4.80 ml (14 mmols) is used as titanium compound.

Thus, 22 g of solid are obtained and are suspended in 200 ml of n-hexane. To the suspension 20.3 ml of a 40.5% by weight solution of isobutyl aluminum dichloride (8.08 g; 42.25 mmols) in n-hexane are added within 30 minutes and at a temperature of 25°–30° C. At the end of the addition the temperature is raised to 66° C. and the suspension is kept under these conditions for 1 hour; The solid is washed many times with solvent and thereafter is dried under nitrogen stream at a temperature of 40° C.

By this way, 20.4 g of a solid component of catalyst containing 13.8% by weight of chlorine, 3.4% by weight of magnesium, 1.6% by weight of titanium and 2.4% by weight of aluminium are obtained. Titanium is for 24% in the trivalent state and for the remaining percentage in the tetravalent state (Table I).

This solid component of catalyst is used in a test for the ethylene polymerization and the results are reported in tables from II to IV.

EXAMPLE 3

The preparation of the solid component of catalyst is carried out as in example 1 but a mixture consisting of 2.40 g (7.0 mmols) of titanium tetrabutylate, 0.8 ml (7.2 mmols) of titanium tetrachloride and 20 ml of n-heptane are used as titanium compound.

20 g of solid are thus obtained and are suspended in 120 ml of n-hexane. To the suspension 9.6 ml of a 40.5% by weight solution of isobutyl aluminium dichloride (3.09 g; 19.94 mmols) in n-hexane is added within 30 minutes and at the temperature of 25°–30° c. At the end of the addition the whole is heated at 66° C. and is kept under these conditions for 1 hour. The solid is washed many times with solvent and thereafter it is dried under nitrogen stream at a temperature of 40° C.

Thus, 19.4 g of a solid component of catalyst containing 13.1% by weight of chlorine, 3.15% by weight of magnesium and 2.3% by weight of titanium are obtained. The titanium is for 30% in the trivalent state and for the remaining percentage in the tetravalent state (Table I).

This slid component of catalyst is used in a ethylene polymerization test and results are reported in Tables from II to IV.

EXAMPLE 4

In a 500 ml round-bottomed flask provided with reflux condenser, mechanical agitator and thermometer, 2.2 g (6.87 mmols) of hafnium tetrachloride and 110 ml of anhydrous ethyl acetate are introduced under nitrogen. The mixture is heated at 77° C. for 1 hour in order to solubilize the hafnium tethrachloride. In the thus obtained solution 17 g of microspheroidal silica are suspended and the contact is kept for 1 hour at the reflux temperature. Thereafter, the ethyl acetate is removed by evaporation from the suspension.

The solid thus obtained is suspended in 228 ml of a solution in n-heptane, containing 9.142 g (54.9 mmols) of $Mg(C_4H_9)_{1.5}(C_8H_{17})_{0.5}$. The whole is allowed to contact for 30 minutes at the temperature of 60° C. and at the end of this period of time the solid is recovered by filtration, is washed many times with n-heptane and is suspended in 200 ml of n-heptane.

To the suspension thus obtained 55 ml (475 mmols) of silicon tetrachloride are added and the whole is contacted for 1 hour at the temperature of 75° C. and at the end of this period of time the solid is recovered by filtration, is washed many times with n-heptane and is suspended in 200 ml of n-heptane.

To the suspension thus obtained 1.54 ml (14 mmols) of titanium tetrachloride are added; after having contacted for 2 hours at 95° C. the whole is concentrated to dryness by evaporating the solvent.

Thus, 22.1 g of a solid component of catalyst containing 14.0% by weight of chlorine, 3.4% by weight of magnesium and 2.8% by weight of titanium are obtained. The titanium is for 14% in the trivalent form and for the remaining percentage in the tetravalent form (Table I).

This solid component of catalyst is used in the ethylene polymerization test and results are reported in Tables from II to IV.

EXAMPLE 5

The example is carried out by operating as in example 4, but at the beginning in a 1 liter round-bottomed flask, 8.8 g (27.47 mmols) of hafnium tetrachloride and 440 ml of anhydrous ethyl acetate are introduced.

Thus 28.7 g of solid component of catalyst containing 15.2% by weight of chlorine, 3.1% by weight of magnesium and 2.2% by weight of titanium is obtained. The titanium is for 17% in the trivalent form and for the remaining percentage it is in the tetravalent form (Table I).

This solid component of catalyst is used in the ethylene polymerization test and results are reported in Tables from II to IV.

TABLE I

| Ex. N. | Molar ratios among reagents | | | | HfCl$_4$/ SiO$_2$ (weight) | % TiCl$_4$/ Ti tot. (mols) | % Ti(OBu)$_4$/ Ti tot. (mols) | Ti (III) % W |
|---|---|---|---|---|---|---|---|---|
| | Ti | Hf | Mg | Si | | | | |
| 1 | 1 | 1 | 4 | 35 | 0,26 | 100 | 0,0 | 31 |
| 2 | 1 | 1 | 4 | 35 | 0,26 | 0,0 | 100 | 24 |
| 3 | 1 | 1 | 4 | 35 | 0,26 | 50 | 50 | 30 |
| 4 | 2 | 1 | 8 | 70 | 0,13 | 100 | 0,0 | 14 |
| 5 | 1 | 2 | 4 | 35 | 0,52 | 100 | 0,0 | 17 |

TABLE II

| Ex. N. | Press. (bar) | Temp. (°C.) | Time (h) | P(H$_2$)/P(C$_2$⁻) | Cocat. | Al/Ti (mols) |
|---|---|---|---|---|---|---|
| 1.1 | 15 | 85 | 1 | 1,1 | TEA | 100 |
| 1.2 | 15 | 85 | 1,5 | 1,1 | TEA | 80 |
| 1.3 | 15 | 85 | 4 | 1,1 | TEA | 25 |
| 1.4 | 15 | 85 | 4 | 0,32 | TEA | 29 |
| 1.5 | 15 | 85 | 4 | 0,62 | TEA | 29 |
| 1.6 | 15 | 80 | 4 | 0,21 | TEA | 29 |
| 1.7 | 15 | 80 | 4 | 0,21 | TIBA | 29 |
| 1.8 | 15 | 80 | 4 | 0,21 | TEA | 30 |
| 1.9 | 15 | 80 | 4 | 0,21 | TIBA | 58 |
| 2 | 15 | 80 | 4 | 0,21 | TEA | 45 |
| 3 | 15 | 80 | 4 | 0,21 | TEA | 31 |
| 4 | 15 | 80 | 4 | 0,21 | TEA | 26 |
| 5 | 15 | 80 | 4 | 0,21 | TEA | 33 |

TABLE III

| Ex. N. | Yield | MFI | | | F/E | F/P | Dens. (g/ml) | App. D. (g/ml) | Sliding (sec.) |
|---|---|---|---|---|---|---|---|---|---|
| | | E | P | F | | | | | |
| 1.1 | 36 | 1,25 | 4,80 | 67,1 | 54 | 14 | 0,9657 | 0,31 | 20 |
| 1.2 | 49 | 2,18 | 8,30 | 106 | 89 | 13 | 0,9668 | 0,28 | 24 |
| 1.3 | 181 | 1,23 | 4,79 | 67,9 | 55 | 14 | 0,9633 | 0,32 | 25 |
| 1.4 | 340 | 0,05 | 0,26 | 4,50 | 90 | 17 | 0,9523 | 0,34 | 21 |
| 1.5 | 231 | 0,28 | 1,25 | 20,6 | 74 | 16 | 0,9617 | 0,33 | 22 |
| 1.6 | 255 | 0,02 | 0,11 | 1,76 | 88 | 16 | 0,9500 | 0,34 | 22 |
| 1.7 | 231 | ND | 0,07 | 1,30 | ND | 19 | 0,9500 | 0,34 | 21 |
| 1.8 | 283 | ND | 0,10 | 1,77 | ND | 18 | 0,9511 | 0,33 | 23 |
| 1.9 | 343 | ND | 0,06 | 1,28 | ND | 21 | 0,9521 | 0,34 | 23 |
| 2 | 245 | ND | 0,03 | 0,65 | ND | 22 | 0,9479 | 0,36 | 19 |
| 3 | 175 | 0,03 | 0,16 | 1,62 | 54 | 10 | 0,9511 | 0,39 | 16 |
| 4 | 250 | 0,03 | 0,14 | 2,42 | 81 | 17 | 0,9518 | 0,36 | 20 |
| 5 | 355 | 0,05 | 0,32 | 4,63 | 93 | 14 | 0,9399 | 0,38 | 20 |

TABLE IV

| Ex. N. | >2000 % | 2000<>1000 % | 1000<>500 % | 500<>250 % | 250<>125 % | 125<>65 % | <63 % |
|---|---|---|---|---|---|---|---|
| 1.1 | 0,2 | 33,4 | 50,6 | 13,2 | 2,2 | 0,2 | 0,2 |
| 1.2 | 0,0 | 0,9 | 51,6 | 40,0 | 6,7 | 0,8 | 0,0 |
| 1.3 | 0,0 | 17,2 | 60,5 | 20,1 | 1,7 | 0,5 | 0,0 |
| 1.4 | 0,1 | 39,7 | 52,2 | 7,3 | 0,1 | 0,6 | 0,0 |
| 1.5 | 0,0 | 23,4 | 61,0 | 13,4 | 1,4 | 0,8 | 0,0 |
| 1.6 | 0,0 | 33,2 | 58,9 | 7,4 | 0,1 | 0,4 | 0,0 |
| 1.7 | 0,1 | 24,4 | 63,9 | 11,1 | 0,5 | 0,0 | 0,0 |
| 1.8 | 0,1 | 32,7 | 55,5 | 11,0 | 0,6 | 0,1 | 0,0 |
| 1.9 | 0,1 | 42,1 | 51,0 | 6,5 | 0,2 | 0,1 | 0,0 |
| 2 | 0,1 | 6,0 | 71,4 | 19,4 | 2,4 | 0,6 | 0,1 |
| 3 | 0,1 | 5,7 | 67,2 | 24,2 | 2,0 | 0,8 | 0,0 |
| 4 | 0,1 | 33,7 | 53,7 | 11,2 | 1,2 | 0,1 | 0,0 |
| 5 | 0,1 | 33,8 | 51,3 | 12,8 | 1,4 | 0,6 | 0,0 |

EXAMPLE 6

The solid component of catalyst obtained in example 1 is used in a fluid bed polymerization reactor. The reactor consists of a pipe having diameter 5 cm and length 80 cm, containing a porous metal disk on the bottom to allow the gas to bubble towards high, through the bed. 5 g of the solid component of catalyst are suspended in 100 ml of isobutane and 1 ml of this suspension is supplied to the reactor. Furthermore, a solution comprising 50 mmols of aluminium triethyl in 100 ml of isobutane is prepared. 10 ml of this solution are introduced in the reactor. A gaseous mixture ethylene:Hydrogen (1:1 by volume) is proportioned to the reactor by means of a tarated rotameter. A valve for the pressure release escapes automatically a portion of the unreacted mixture, thus maintaining the pressure of the system constant at 20 bar. The escaped gaseous mixture is recycled in the reactor through a compressor and is mixed with the fresh feeding. The recycle rate is adjusted by means of a valve for the flux control to obtain a suitable fluidification and mixing level. The temperature in the reactor is controlled by allowing the recycle stream and the fresh one to pass either through a cooler, or through a heater to fix the entrance temperature in the reactor. The cocatalyst solution is pumped by means of a tarated metering pump and is allowed to pass through a coil into a heated bath, to completely evaporate the solution. The vapor stream is then injected in the recycle stream of the ethylene-hydrogen stream. At the starting of the test 1 ml of the suspension of the solid component of catalyst, as above indicated, is injected and the ethylene-hydrogen mixture is allowed to flow. When the system reaches the stationary state the cocatalyst is fed and the polymerizations starts.

The duration of the test is 4 hours with a polymerization temperature of 90° C. A yield of 8.5 kg of polymer for gram of solid component of catalyst is obtained and the polyethylene produced shows the following characteristics:
density: 0.9640 g/ml;
MFI (2.16 kg): 1.40 g/10';
MFI (21.6 kg)/MFI (2.16 kg): 53.3;
apparent density: 0.44;
granules size (micrometers):

| | |
|---|---|
| >2000 | 0.0% by weight |
| 2000<>1000 | 30.8% by weight |
| 1000<>500 | 34.8% by weight |
| 500<>125 | 34.1% by weight |
| <125 | 0.3% by weight |

EXAMPLE 7

There was operated in a similar way as in example 6, using the solid component of catalyst of example 4 and supplying to the reactor an ethylene:butene:hydrogen mixture 1:1:0.3 by volume.

A yield of 8.5 kg of ethylene-butene-1 copolymer for 1 gram of solid component of catalyst is obtained and the product shows the following characteristics:
density: 0.9450 g/ml,
MFI (2.16 kg): 1.3 g/10';
MFI (21.6 kg)/MFI (2.16 kg): 37.5;
apparent density: 0.53;
granules size (micrometers):

| | |
|---|---|
| >2000 | 0.0% by weight |
| 2000<>1000 | 21.2% by weight |
| 1000<>500 | 43.5% by weight |
| 500<>125 | 35.1% by weight |
| <125 | 0.2% by weight |

We claim:

1. Process for the preparation of a solid component of a catalyst for the (co)polymerization of ethylene, containing magnesium, chlorine, silicon, titanium and at least another metal selected from the group consisting of hafnium, zirconium and vanadium, on a granular solid carrier, which process consists essentially of:
   (i) adsorbing a compound of a metal M selected from the group consisting of hafnium, zirconium and vanadium on a solid, granular and porous carrier by contacting said carrier with a solution of a compound of the metal M, in an organic solvent, followed by evaporation of the solvent;
   (ii) impregnating the solid carrier treated in step (i) with a solution, in an organic solvent, of a magnesium dialkyl or magnesium alkyl halide, followed by evaporation of the solvent;
   (iii) contacting the solid carrier treated in step (ii) with a silicon chloride; and
   (iv) contacting the solid carrier treated in step (iii) with a titanium compound to give a solid component of a catalyst
   wherein the quantity of carrier in said solid component of catalyst is 30 to 90% by weight, the atomic proportions among titanium, metal M, magnesium and silicon in the reagents are within the following ranges Ti:M:Mg:Si=1:0.1–3:1–20:0.1–50.

2. Process according to claim 1, characterized in that in step (i) a microspheroidal silica having a particle size from 20 to 100 micrometers, a surface area BET from 150 to 400 $m^2/g$, a total porosity higher than 60% and a pores radius from 50 to 200 angstrom is used.

3. Process according to claim 1, characterized in that in step (i) a vanadium, zirconium or hafnium compound is used selected from the group consisting of chlorides, oxychlorides and alkoxides.

4. Process according to claim 1, characterized in that in step (i) a solution of the metal M in an organic solvent selected from the group consisting of alkyl esters of aliphatic or aromatic carboxylic acids and aliphatic ethers is prepared and to the solution thus obtained the granular carrier is added, maintaining a ratio by weight between the carrier is and the compound of the metal M equal to at least 2/1 and the impregnation of the carrier is carried out by heating the resulting suspension at a temperature higher than the room temperature for a time within 0.5–2 hours.

5. Process according to claim 1, characterized in that in step (ii) a magnesium dialkyl or magnesium alkyl chloride is used selected from the group consisting of those which can be defined by the formula MgR'R" and MgRX wherein R', R" and R each independently represent a linear or branched alkyl group containing from 1 to 10 carbon atoms and X represents a halogen atom.

6. Process according to claim 1, characterized in that said magnesium dialkyl or magnesium alkyl halide are dissolved in a hydrocarbon solvent, to the solution the carrier impregnated in step (i) is added, while keeping a molar ratio between the magnesium compound and the compound of the metal M equal to or higher than 1/1 and the resulting suspension is kept at a temperature from the room temperature (20°–25° C.) to the boiling point of the solvent used, for a time from about 10 minutes to about 2 hours.

7. Process according to claim 1, characterized in that in step (iii) said silicon chloride is silicon tetrachloride.

8. Process according to claim 1, characterized in that in step (iii) the solid obtained in step (ii) is suspended in a hydrocarbon solvent, a silicon chloride is added to the thus obtained suspension and the whole is heated at a temperature from 40° to 100° C. for a period of time of from 0.5 to 5 hours.

9. Process according to claim 1, characterized in that in step (iv) a titanium compound is used selected from the group consisting of titanium tetrachloride, titanium tetra-n-propylate, titanium tetra-n-butylate, titanium tetra-i-propylate, titanium tetra-i-butylate and the corresponding titanium mono- or di-chloro alkoxides.

10. Process according to claim 1, characterized in that in step (iv) the solid obtained in step (iii) is suspended in a hydrocarbon solvent, the titanium compound is added to the suspension in such a quantity to have an atomic ratio between titanium and silicon (in the silicon chloride of step (iii) Ti:Si=1:3-40, and is maintained at a temperature from 50° to 100° C. for a time from 0.5 to 5 hours.

11. Process according to claim 1, characterized in that the solid component of catalyst consists of from 40 to 70% by weight of carrier, the atomic proportions in the catalytically active portion being as follows: Ti:M:Mg=1:0.5-2:2-8.

12. Process according to claim 1, characterized in that the solid component of a catalyst, obtained at the end of the step (iv), is subjected to activation by contact with an aluminum alkyl chloride, working in suspension in a hydrocarbon solvent, with a ratio between chlorine atoms in the aluminium alkyl chloride and the alkoxy groups of the titanium alkoxide or chloroalkoxide, from 0.1/1 to 10/1, at a temperature from 10° to 100° C. and for a time from 10 minutes to 5 hours.

13. Catalyst for the polymerization of ethylene and for the copolymerization of ethylene with an alpha-olefin, consisting of a solid component prepared according to the process of claim 1, and of a aluminum organo metal compound with an atomic ratio between the aluminum in the organometal aluminum compound and the titanium in the solid component of catalyst, from 0.5:1 to 1000:1.

14. The process of claim 1 wherein the metal compound M is a chloride.

15. The process of claim 4 wherein the organic solvent is a cyclic ether and the suspension is heated from 70° to 80° C. for 0.5-1 hour.

16. The process of claim 5 wherein X is chlorine and said magnesium compounds are selected from the group consisting of magnesium diethyl, magnesium ethylbutyl, magnesium dihexyl, magnesium butyloctyl, magnesium dioctyl, and the corresponding chloro derivatives.

17. The process of claim 6 wherein the suspension is kept at a temperature of 50°-70° C. for 0.5-1hour.

18. The process of claim 8 wherein the temperature is 70°-95° C. for 1-2 hours.

19. The process of claim 10 wherein the temperature is 60° to 90° C. for 1-2 hours.

20. The catalyst of claim 13 wherein said aluminum organometal compound is an aluminum trialkyl and said atomic ratio is from 50:1 to 200:1.

* * * * *

UNITED STATES PATENT AND TRADEMARK OFFICE
CERTIFICATE OF CORRECTION

PATENT NO. : 5,258,342
DATED : November 2, 1993
INVENTOR(S) : Luciano Luciani et al.

It is certified that error appears in the above-indentified patent and that said Letters Patent is hereby corrected as shown below:

On the title page, Item [21],

The application number, should be: --841,496--

Signed and Sealed this

Twelfth Day of April, 1994

Attest:

BRUCE LEHMAN

*Attesting Officer*   *Commissioner of Patents and Trademarks*